Dec. 28, 1926.
E. F. TES
SAUSAGE TWISTING MACHINE
Filed June 8, 1926
1,612,234
4 Sheets—Sheet 1

Inventor
EVDOKIM F. TES,
By J. P. Govin
Attorney

Dec. 28, 1926.
E. F. TES
1,612,234
SAUSAGE TWISTING MACHINE
Filed June 8, 1926    4 Sheets-Sheet 2
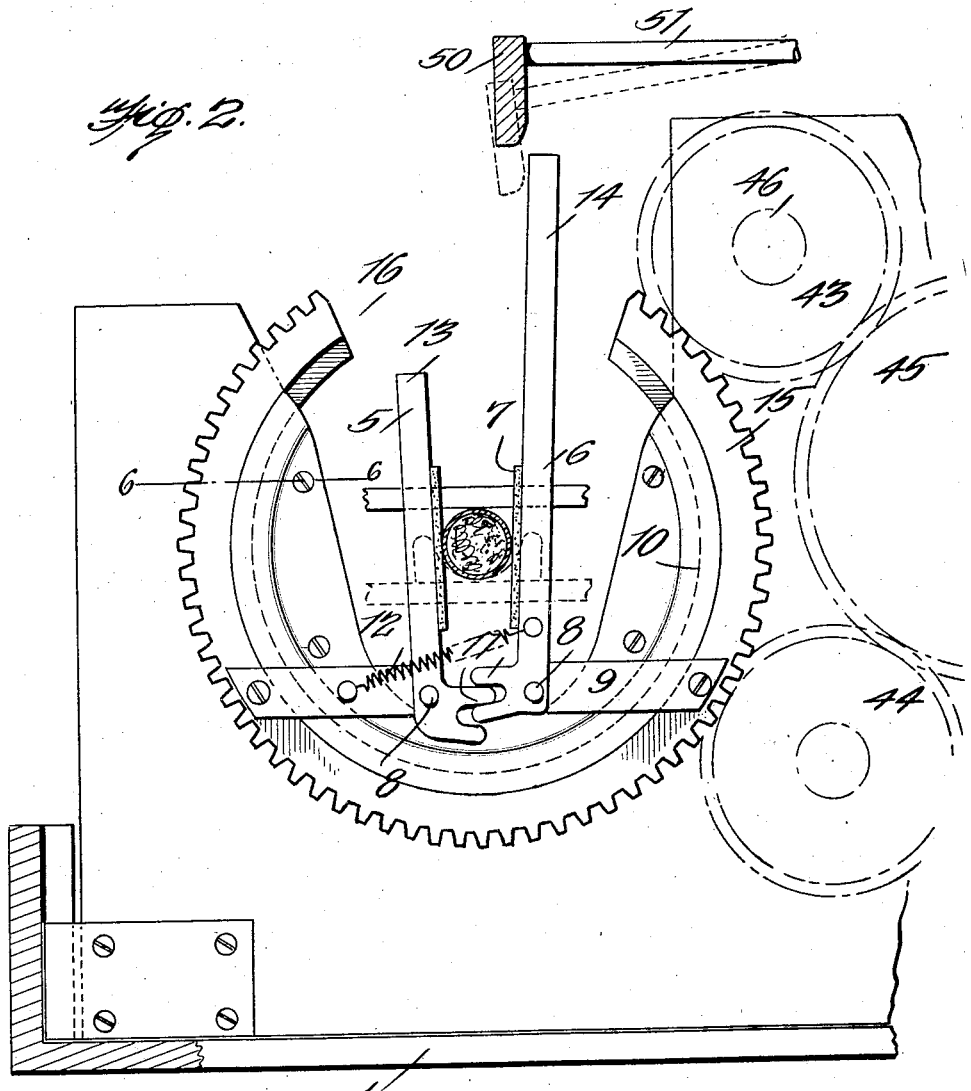
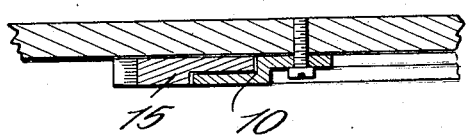
Inventor
EVDOKIM F. TES,
By J. P. Govin
Attorney

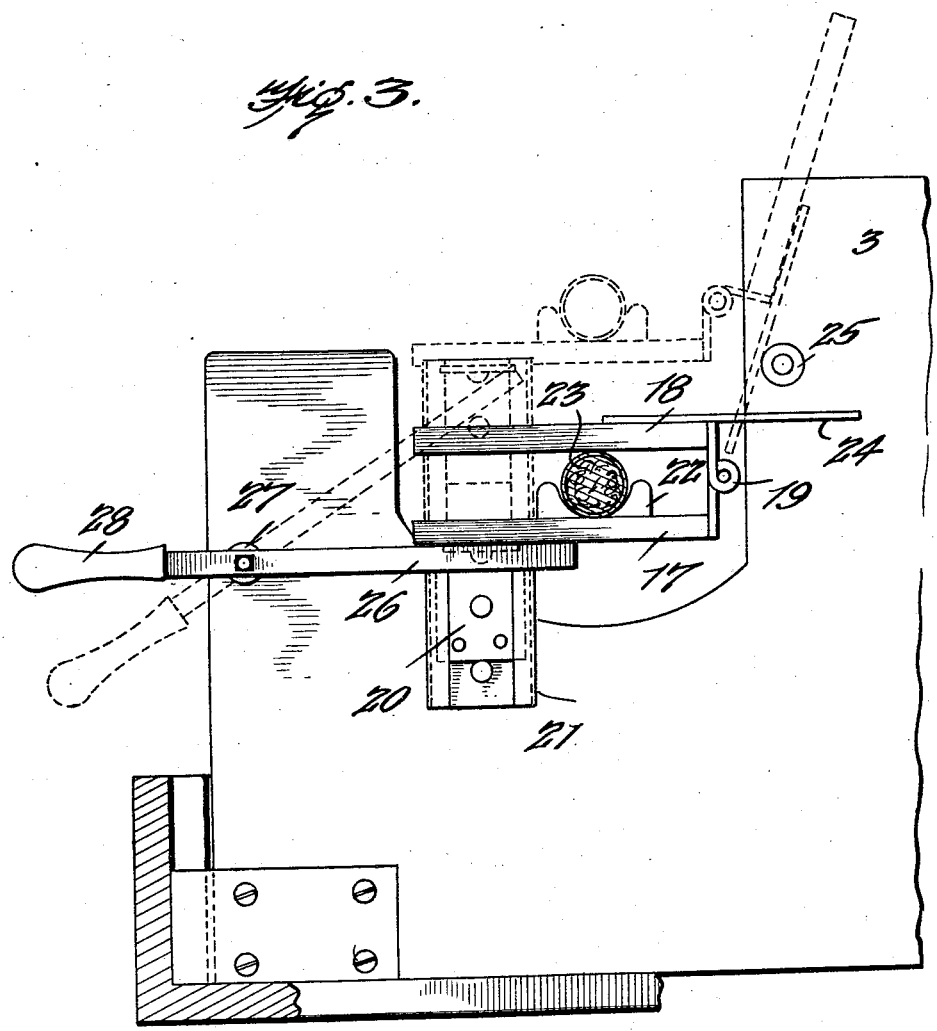

Dec. 28, 1926.

E. F. TES

SAUSAGE TWISTING MACHINE

Filed June 8, 1926 4 Sheets-Sheet 4

1,612,234

Inventor

EVDOKIM F. TES,

By J. P. Gorrie

Attorney

Patented Dec. 28, 1926.

1,612,234

UNITED STATES PATENT OFFICE.

EVDOKIM F. TES, OF SEATTLE, WASHINGTON.

SAUSAGE-TWISTING MACHINE.

Application filed June 8, 1926. Serial No. 114,445.

This invention relates to a machine in which sausage in the filled casing form may be divided and intertwisted in the familiar linked construction.

The invention is directed to providing a means by which the sausage link may be gripped at intervals corresponding to the usual linked link, the short section of sausage between these links compressed and held to define a fixed point, the link holding means being then relatively rotated to twist the short sections, and thus separate the links so far as the material is concerned while maintaining a connection between such links of the intertwisted casing.

The invention is illustrated in the accompanying drawings in which:—

Fig. 2 is a transverse section through the machine showing particularly the rotatable gripper and the means for automatically opening the plates thereof.

Fig. 3 is a transverse section through the machine showing particularly the fixed gripper and the manner of opening the plates thereof.

Fig. 6 is a section on line 6—6 of Fig. 2.

Figure 1:
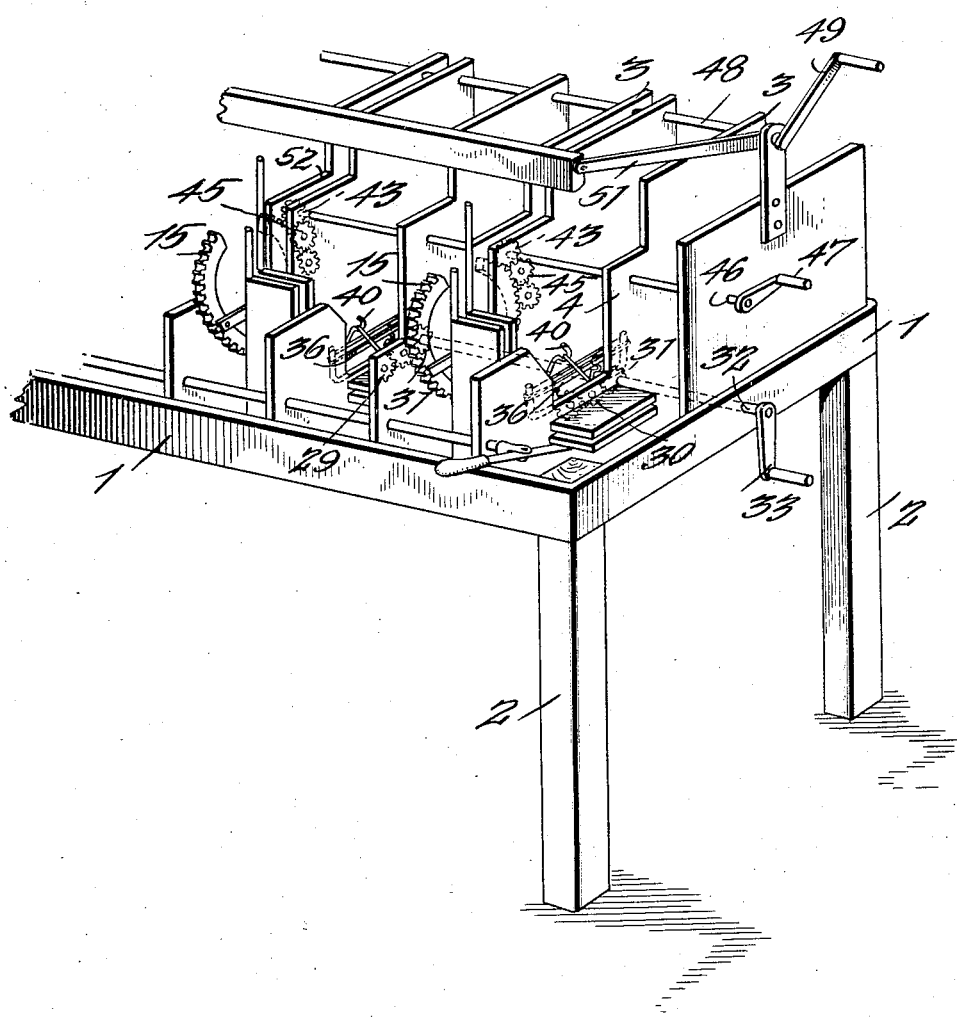
Fig. 1 is a perspective view of the improved machine.
Figure 4:
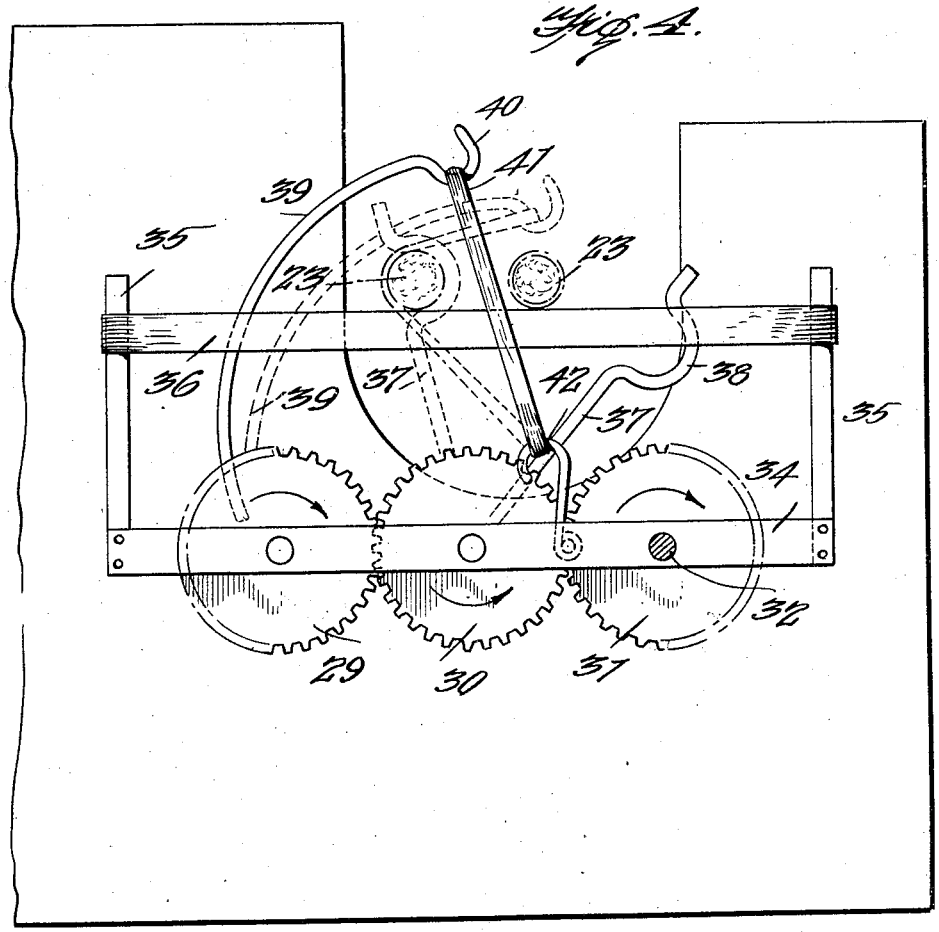
Fig. 4 is a transverse view through the machine showing particularly the means for compressing the casing between the grippers.
Figure 5:
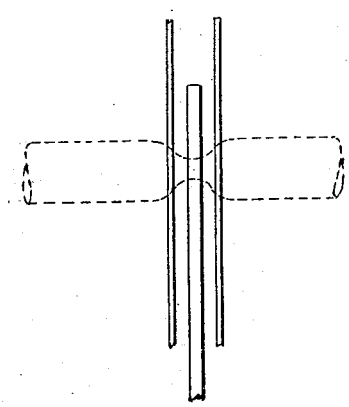
Fig. 5 is a broken plan view showing the cooperating means for compressing the sausage casing.

The improved machine comprises a supporting frame including a rectangular base 1 of skeleton form supported upon legs 2. Base 1 is divided by transverse partitions 3 with certain of the partitions spaced apart to receive the linked gripping sections, others of the partitions being spaced apart a less distance to house the operating mechanism.

Supported in alignment longitudinally of the frame are sausage gripping members arranged in pairs on the respective sides of the partitions 3, the partitions being vertically recessed at 4 in alignment with the gripping members. The gripping members are successively of different type and alternately of the same type, being designated as fixed gripping members and rotary gripping members. The rotary gripping members which are shown more particularly in Figure 2 include spaced plates 5 and 6 each provided on the inner surface with a protective layer 7, and each pivoted at 8 to a cross bar 9 of a rotary frame 10. The meeting faces of the plates at their lower ends are formed with interfitting projections 11 to insure similar movements of such plates, a spring 12 secured to plate 6 and to the frame bar 9 serving to normally hold the plates in gripping relation, one of the plates as 5 has a handle extension 13 and the other of said plates as 6 has a somewhat longer operating extension 14. The frame 10 is provided with a gear 15 interrupted at 16 to permit access between the plates 5 and 6.

The fixed gripping members comprise plates 17 and 18 pivotally connected at 19 and supported from a block 20 slidably mounted in a vertical guide way 21 the block being connected to the plate 17, and the latter preferably formed with a channelled block 22 to receive the sausage indicated at 23. The plate 18 has an extension 24 adapted when the plates are elevated as described to engage a roller stop 25 on the adjacent partition 3 to thereby open the plates. The fixed gripping members are operated by their being raised and lowered with respect to normal position, the raising medium being a bar 26 extending from a shaft 27 mounted in the partition 3 and operated by a handle 28, whereby all of the fixed gripping members may be simultaneously operated.

Mounted intermediate each pair of grippers is mechanism for compressing the material in the sausage casing so as to define a portion of such casing free of material to permit a twist at this point. This mechanism comprises a plurality of intermeshing pinions 29, 30, and 31, the latter of which is mounted on a shaft 32 extended beyond the frame and operated by handle 33. Secured upon the particular partition is frame bar 34, on which the pinions are supported, from the respective ends of which rise posts 35 over which is looped a rubber band 36. A compressing member 37 is connected to the pinion 30 and formed with a semicircular depression 38 in position to engage the sausage resting upon the rubber band 36. A compressing lever 39 is secured to the pinion 29, projecting therefrom in curved form and terminating in a hook 40 over which is looped a rubber band 41 the opposite terminal of which is connected to a hook 42 secured to the frame bar 34. Obviously as the shaft 32 is rotated the sausage is compressed at a particular point by the members 37 and 39, or more particularly the rubber band held by the latter, thereby forcing the material in each direction beyond the particular point of compression and providing a comparatively free portion of the sausage casing to permit intertwisting.

The gear 15 is operated from pinions 43 and 44 connected by an intermediate pinion 45, the pinions 43 being mounted upon a shaft 46 operated by handle 47. Two pinions 43 and 44 are provided to permit continuous movement of the rotary grippers notwithstanding the mutilated gear 15. The shaft 48 is mounted at the rear portion of the partition and operable by handle 49, this shaft carrying a trip rod 50 through connecting bars 51. The trip bar is designed when in operative position to rest on shoulders 52 of the partitions 3 and in the path of movement of the extension 14 of the plate 6.

In operation a length of sausage casing with the contained material is placed in the machine resting upon the rubber bands 36 and within the grippers, the shaft 27 having been operated to open the fixed grippers and the handle 13 having been operated to open the rotary grippers. Shaft 32 is then operated to form the divisions between the links by the compressing members referred to, following which the grippers are closed to grip the respective links. By the arrangement of the grippers it will be apparent that each alternate link is held stationary in the fixed grippers, the remaining alternate links being held in the movable grippers. Shaft 46 is then operated turning the rotary grippers on an axis which is in the line of the placed link with the effect to twist the link in the rotary grippers relative to the links in the fixed grippers to thus effect the twisting of the sausage casing for the production of the well known line of separation between the links.

When the twisting has reached the desired extent the trip bar 50 is lowered and on the next rotation of the rotary grippers the extension 14 engages the trip bar thereby opening the rotary grippers to release the sausage. The shaft 32 is rotated to release the compressing members and the shaft 27 is operated to raise and open, through the extension 24 and stop 25, the fixed grippers. The sausage length, formed into links, may then be freely lifted from the machine and the operation repeated on the next length.

What I claim is:

1. A machine for forming a sausage length into links comprising alternately arranged fixed and rotary grippers in which the sausage length is held, each of the grippers comprising pivotally connected plates, and means whereby the plates of the respective grippers may be simultaneously spaced apart to permit the introduction of the sausage, and means for compressing the casing of the sausage between the respective grippers to permit an intertwisting.

2. A machine for forming a sausage length into links comprising alternately arranged fixed and rotary grippers comprising pivotally connected plates, and means whereby the plates of the respective grippers may be simultaneously spaced apart to permit the introduction of the sausage, levers mounted intermediate the gripping members and adapted in operation to exert a compressing force on the sausage casing and means for operating the levers.

3. A machine for forming a sausage length into links comprising alternately arranged fixed and rotary grippers comprising pivotally connected plates, and means whereby the plates of the respective grippers may be simultaneously spaced apart to permit the introduction of the sausage, levers mounted intermediate the gripping members and adapted in operation to exert a compressing force on the sausage casing and means for operating the levers, said lever mechanism including a resilient member to directly engage the sausage casing.

4. A machine for twisting sausage lengths into links including alternately disposed fixed and rotary grippers, the rotary grippers comprising spaced plates mounted for relative pivotal connection and having their ends formed to compel simultaneous and similar movements of the plate, and manually operable means to be disposed into the path of movement of one of the plates at will to interrupt movement of such plates and therefore compel an opening of the plates.

5. A machine for twisting sausage lengths into link form comprising alternately arranged rotary and fixed grippers, each of the grippers comprising a pair of plates mounted for relatively swinging movement, manual means for relatively moving the plates of the fixed grippers, and means for automatically and relatively moving the plates of the rotary grippers.

In testimony whereof I affix my signature.

EVDOKIM F. TES.